United States Patent [19]
Atsumi

[11] Patent Number: 5,594,639
[45] Date of Patent: Jan. 14, 1997

[54] ORDER PROCESSING CONTROL MODULE

[75] Inventor: Ryo Atsumi, c/o Mitsui Engineering & Shipbuilding Co., Ltd. 6-4, Tsukiji 5-chome, Chuo-ku, Tokyo 104, Japan

[73] Assignee: Ryo Atsumi, Chiba, Japan

[21] Appl. No.: 84,066

[22] Filed: Jun. 30, 1993

[30] Foreign Application Priority Data

Jun. 30, 1992 [JP] Japan .................................. 4-196555

[51] Int. Cl.⁶ .................................................. G06F 17/60
[52] U.S. Cl. ...................................................... 364/468.14
[58] Field of Search .................................... 364/401, 402, 364/406, 468

[56] References Cited

U.S. PATENT DOCUMENTS

| | | | |
|---|---|---|---|
| 4,459,663 | 7/1984 | Dye | 364/408 |
| 4,887,218 | 12/1989 | Natarajan | 364/468 |
| 5,197,001 | 3/1993 | Mukherjee | 364/403 |
| 5,231,567 | 7/1993 | Matoba et al. | 364/401 |
| 5,237,495 | 8/1993 | Morii | 364/401 |
| 5,285,392 | 2/1994 | Kyle et al. | 364/468 |
| 5,325,304 | 6/1994 | Aoki | 364/468 |

*Primary Examiner*—Donald E. McElheny, Jr.
*Assistant Examiner*—Frantzy Poinvil
*Attorney, Agent, or Firm*—Oliff & Berridge

[57] ABSTRACT

An order processing control module uses computer processing provided with an upper level ledger to which an upper level order is input from the outside. There is provided a first element for exploding orders into component requirements by exploding an order read from the upper order ledger into components based on a previously registered bill of materials, calculating the required amount of individual components and outputting the same to a release order ledger. Furthermore, there are also provided an internal order ledger to which the required amounts of individual components are input from the release order ledger, and a second element for exploding orders into operation/resource requirements by exploding an order input from the internal order ledger into processes and calculating the resource load based on previously registered components/resources data. And, an external release order ledger is also provided by which an order can be output to the outside based on the output from the second elements for exploding orders into operation/resource requirements, whereby order processing is controlled while exchanging orders to and from the outside. This order processing control module can be applied to all the hierarchies of various fields so that these hierarchies can be easily integrated and further makes possible general-purpose order processing control extending schedule control and sequence control.

10 Claims, 6 Drawing Sheets

ORDER PROCESSING CONTROL MODULE

FIELD OF THE INVENTION

The present invention relates to an order processing control module, and more specifically, to an order processing control module appropriate for being used in a processing system in which the processing of an order must be controlled based on a sequence or a period of time as represented by production control, schedule control, or sequence control.

BACKGROUND OF THE INVENTION

Various fields of production control, schedule control, and sequence control or from management to services including these control elements, are remarkably computerized with the progress of computers and microprocessors. In computerizing them, programs or devices are individually created, or software or devices limited in their application field, application hierarchy, and industrial field are being utilized.

For example, business work executed by the division of labor is characterized by distributed processing in individual unit organizations having a holonic architecture, and furthermore, the following functions are required in business work executed by the division of labor:

(1) provide the necessary functions for the execution of a set of missions and self-preservation selected from such functions as management, resource management, marketing and product development, sales, engineering, procurement and storage, production, logistics, construction, and services; and (2) deliver ordered items, information (documents) or work/services within the designated delivery time in response to external orders.

On the above-mentioned premises, the type of operations actually executed by individual unit organizations of the business work are:

1. to receive inquiries and prepare and submit quotations;

2. to make production plans for ordered items, produce the items and carry out schedule control, cost control, and quality control;

3. to make plans for purchasing and sub-contracting and place an order to the sub-contractor through the process of inquiry/quotation and control purchasing and sub-contracting; and 4. upon completion of the above, to deliver/bill them, receive payment, and further process any complaints and provide services.

In the above form of operations, it is important to follow the sequence of operations and scheduled dates, and the following methods are conventionally employed for this purpose.

The first method is the explosion of orders into component requirements, wherein the components necessary to produce an ordered item are listed using the bills of material. It is checked whether or not the required amount is available at the scheduled date, and if there is a shortage, an additional order is made by a sub-order and it is also checked whether or not the ordered item can be completed on the scheduled date.

The second method is the explosion of orders into operation/resource requirements, wherein the sequence for producing an ordered item is selected from the process chart. It is checked whether or not the necessary resources such as manpower, equipments, etc. are available at the scheduled date, and if not, a countermeasure such as sub-contracting or overtime work is taken.

The third method is the PERT technique, wherein the operations for producing an ordered item are listed and are sequentially connected to each other with arrows to make a network, and whether a plan for producing the item is possible or not is checked from the required period of time and resources necessary for the individual operations.

The fourth method is the Gantt chart, wherein the components necessary to produce an ordered item are listed and the operational stages for producing the individual components are established and whether a plan for producing the item is possible or not is checked from the individual required periods of time and resources necessary for the individual operational stages.

The fifth method is sequence control, wherein all previously presumable conditions are listed and the action to be taken when a specific condition arises is predetermined so that simulation or production can be automatically executed.

Furthermore, all the aforesaid methods are characterized in that it is necessary not only to make the initial plan but also to feedback actual results for replanning at any time or periodically.

The above methods, however, have the following disadvantages.

The first explosion of orders into component requirements does not have a sequence explosion function, so it is not useful for checking the resource load.

The second explosion of orders into operation/resource requirements does not have a component explosion function, so it is not useful for checking the material requirements or grasping their interrelationship.

The third PERT technique does not have component explosion function and lacks the concept of a process chart, so standardization and automated processing are difficult to be executed. As a result, it is not easy to incorporate changes into a new plan. Also, because this method is composed of a network, expediting is practically difficult.

The fourth Gantt chart lacks the concept of the bill of materials and process chart, so standardization and automated processing are difficult to be attained, and as a result it is not easy to incorporate changes into a new plan, and furthermore, it is difficult to grasp the relations among the items listed on the chart.

The fifth sequence control lacks the concept of component explosion, so the relations among components is difficult to be grasped, and further more, any change in sequence control is difficult because it is preprogrammed, and flexible measures are difficult to be preprogrammed.

Therefore, with these conventional methods, methods which are not related to each other are employed when the respective hierarchies from the overall enterprise level down to the controller level are intended to be entirely or partially integrated as represented by computer integrated manufacturing (CIM). Thus, not only the existing systems but even systems being planned are difficult to be interfaced with each other and the accomplishment of integration will be difficult.

SUMMARY OF THE INVENTION

Taking the above conventional problems into consideration, the purpose of the present invention is to provide a general-purpose order processing control module which can be applied to all the hierarchies of the above various fields, can be easily integrated, and further more, extends schedule control and sequence control.

To achieve the above purpose, the order processing module related to this invention is an order processing control module making use of computer processing. The module comprises: an upper level order ledger to which an upper level order is input; a first means for exploding orders into component requirements by exploding an order read from the upper level order ledger into components, calculating the required amounts of individual components based on a previously registered bill of materials and outputting the same to a release order ledger; an internal order ledger to which the required amounts of individual components are input from the release order ledger, a second means for exploding orders into operation/resource requirements by exploding an order read from the internal order ledger into required process sequences and calculating the resource load based on previously registered components/resources data; and an external release ledger capable of outputting an order based on the output from the second means for exploding orders into operation/resource requirements, whereby orders are controlled while exchanging them to and from the outside.

According to the above structure, the order processing units of the respective hierarchies from the enterprise level down to the controller level on production control, schedule control, and sequence control or the various fields from management to services containing these elements, can be made into the same structure by applying the control module according to the present invention to control the respective orders. And, an integrated system can be realized by connecting these units of the same structures.

DESCRIPTION OF PREFERRED EMBODIMENT

A specific embodiment of the order processing control module according to the present invention will be described below in detail.

In this embodiment, business work executed by the division of labor is selected as an existing model to be subjected to processing by order processing control and integrally constructed with a unique structure.

The order processing control module according to the embodiment employs the order cell method to provide an integrated environment for business work to be executed by the division of labor. Since the defects of the methods used to maintain the sequence and schedule of jobs which are important factors to business work done by the division of labor can be removed by the combination of the explosion of orders into component requirements and the explosion of orders into operation/resource requirements, the order processing control module includes both of a first means 10 for exploding orders into component requirements and a second means 32 for exploding orders into operation/resource requirements. The module also provides a special type of components classification so that the order processing control module can be easily applied to business work requiring the execution of an order based on the sequence, amount and period of time, or the sequence and period of time represented by production control, schedule control, or sequence control, so the business work can be integrated. That is, the order cell method is employed.

The order processing control module according to the embodiment is structured as described below.

Figure 1:
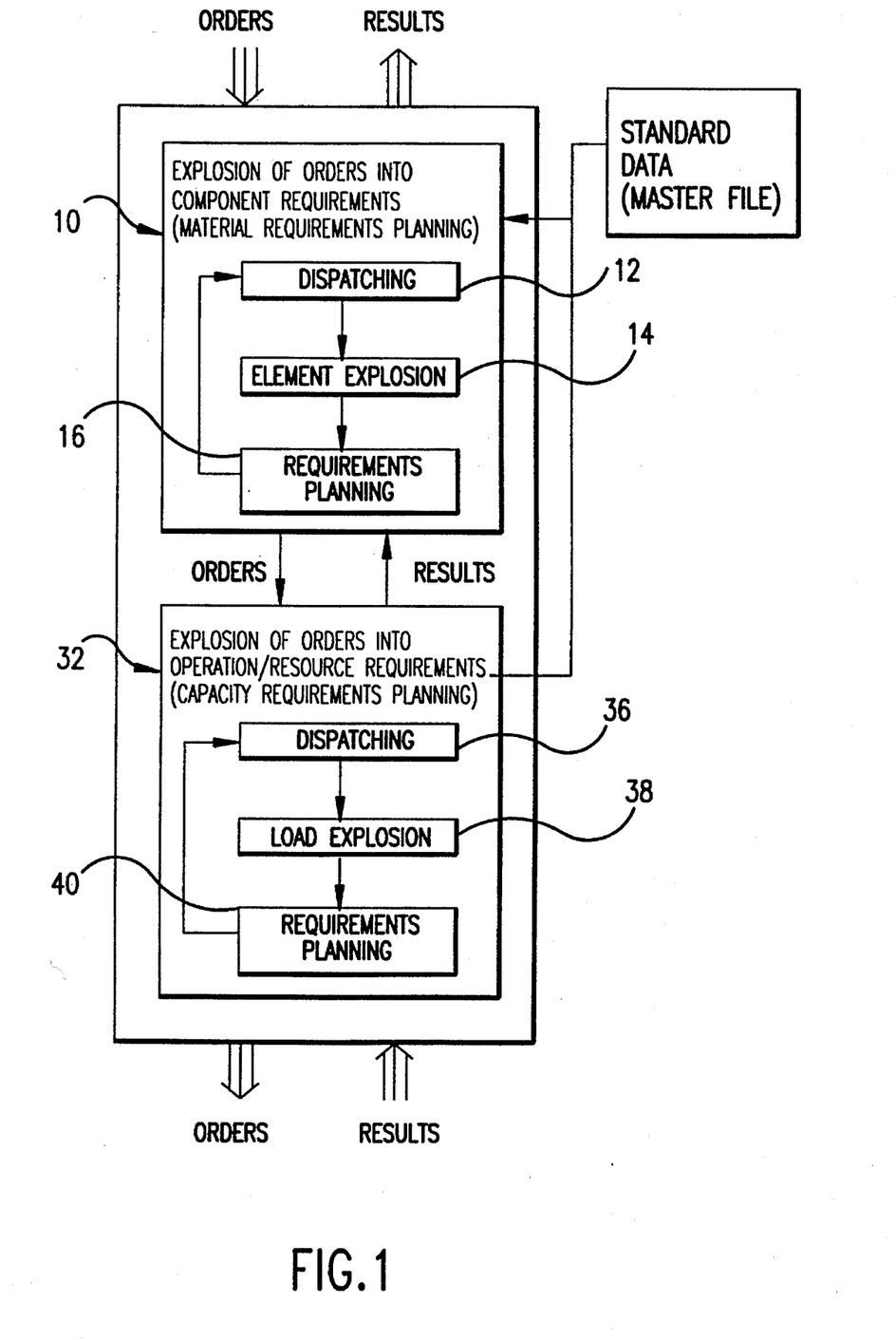
FIG. 1 is a diagram of the structure of an order processing control module according to a preferred embodiment.

According to the embodiment, the order processing control module has an internal structure shown in FIG. 1 to process sequentially input actual orders. More specifically, it is composed of an element 10 for exploding orders into component requirements and an element 32 for exploding orders into operation/resource requirements connected to each other in series.

The first means 10 for exploding orders into component requirements is composed of a dispatching processing unit 12, an element explosion processing unit 14, and a requirements planning processing unit 16, wherein the dispatching processing unit 12 determines the date of the starting point or ending point of an order, the element explosion processing unit 14 explodes an order to its components by using a bill of materials and inputs the same to the requirements planning processing unit 16 to allocate stocked components or ordered components to their respective orders. If they are insufficient, the items and amounts of the insufficient components are repeatedly fed back to the dispatching processing unit 12 until the components cannot be further exploded.

The second means 32 for exploding orders into operation/resouce requirements is composed of a dispatching processing unit 36, a load explosion processing unit 38, and requirements planning processing unit 40, wherein the dispatching processing unit 36 receives an order generated as a result of the explosion of orders into component requirements and determines the date of the starting point or ending point of the order, and the load explosion processing unit 38 generates a process sequence by using a process chart and explodes the load for the individual resources and inputs the same to the requirements planning processing unit 40 to plan the load for the respective resources such as equipments, manpower, tools, jigs, orders to sub-contractors, and the like. The result of the plan or the execution of the plan is reported to the first means 10 for exploding orders into component requirements.

Both the first and second explosion means 10, 32 act as an integral unit externally, and receive an order from and report the result of the plan and the execution of the plan to the orderer. Both explosion means, acting as an integral unit, send a sub-order to and receive the report of the result of a plan and the execution of the plan from the other explosion means where the sub-order has been executed. A more specific structure will be described with reference to FIGS. 2 and 3.

A. Explosion of Orders into Component Requirements Processing

Figure 2:
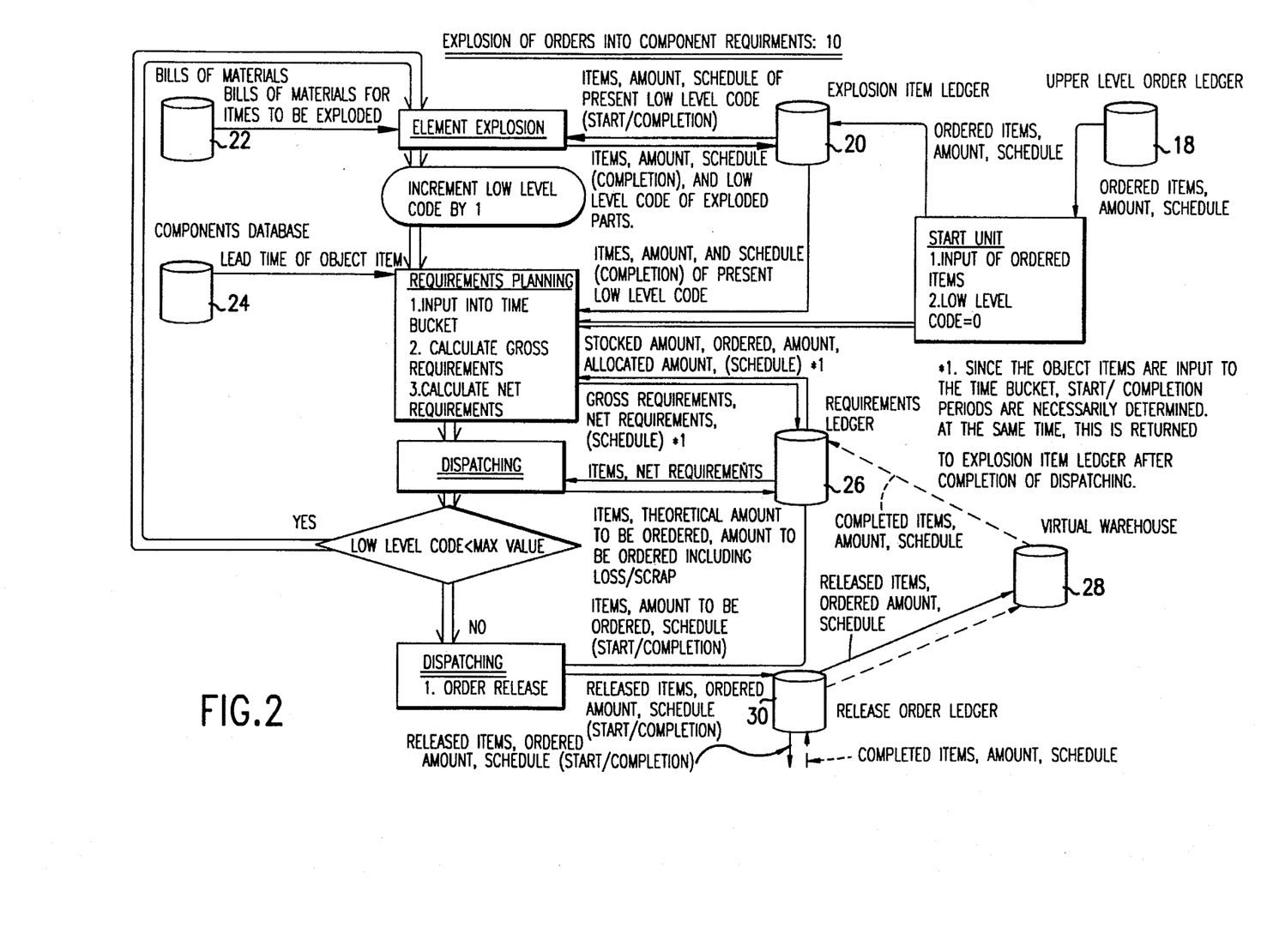
FIG. 2 is a diagram explaining the internal structure of a means for exploding orders into component requirements of the above module.

First, the order processing control module includes the means for exploding orders into component requirements 10 which is provided with the dispatching processing unit 12, element explosion processing unit 14 and requirements planning processing unit 16 internally. Processing in the module is executed by using the material requirements planning (MRP) method in the following sequence. More specifically, although an ordered item is received as a final product, it is exploded as a combination of a plurality of components or standard modules and these exploded elements are further exploded into their composing elements. These composing elements are sequentially coded into low level codes in accordance with the explosion order thereof from an upper level product, wherein a final product has a low level code of n=0 and the explosion order is sequentially determined as n=1, 2 . . . in accordance with the sequence by which they are exploded. Then, requirements planning processing, dispatching processing, and explosion processing are sequentially executed from a low level code=0 and the same processings are repeated for individual low level codes by incrementing the low level code by 1.

From the above-mentioned, the order processing control module serves as an input unit for an upper level order and includes an upper level order ledger 18 for receiving an order input from an orderer, and the instructed contents for production (ordered item, amount and schedule) are written to the upper level order ledger 18. The upper level order includes such contents as expected orders based on the forecasts of demand and stock, firm and tentative orders, and the like in addition to a simple instruction for production.

There is provided a explosion item ledger 20 as an intermediate file to which the order of the upper level order ledger 18 is input. A start unit selects an item to be processed at present from the upper level orders in the upper level order ledger 18 and inputs the same to the explosion item ledger 20, sets a low level code=0, delivers the explosion item ledger 20 to the requirements planning processing unit 16, and then issues a command to start processing repeating from a low level code 0 to the maximum low level code to the requirements planning processing unit 16, dispatching processing unit 12, and element explosion processing unit 14.

The requirements planning processing unit 16 inputs into the time bucket only those items corresponding to the low level code to be processed at present, i.e., a final product when the low level code=0. and otherwise components corresponding to the current low level code among the exploded components, and calculates the gross requirements. A time bucket is a division of a continuous flow of time up to the delivery date of an ordered item into suitable small adjacent periods of time such as a week, a day or an hour unit. Data is read from the components database 24 in which the lead times of individual components are pre-stored, and the object component is input relative to the time bucket to calculate the gross requirements of the component. In this case, when the time bucket width of the upper level order is smaller than the present time bucket width, the object component may be input as it is, but when the former is larger than the latter, the object component may fundamentally be equally input to each time bucket. Further more, the requirements planning processing unit 16 compares the gross requirements determined for the individual time buckets with the amount obtained by subtracting the amount allocated to other orders from the stocked amount and the ordered amount, i.e., with the theoretical stock to thereby calculate the insufficient amount as the net requirements.

There is provided a requirements ledger 26 with a time bucket to which the gross requirements and net requirements determined by the requirements planning processing unit 16 are input. When an item is received, the requirements ledger 26 changes the item from an ordered item to a received item i.e., from an ordered amount to a stocked amount based on the data of a virtual warehouse 28 to be described later. The requirements ledger 26 having finished requirements planning for individual low level codes is transferred to the dispatching processing unit 12 each time the planning has been finished.

The dispatching processing unit 12 uses the net requirements calculated by the requirements planning processing unit 16 as a theoretical amount to be ordered and calculates the amount to be ordered including loss/scrap from the theoretical amount to be ordered and loss/scrap rate stored in the above components database 24. Furthermore, when the amount to be ordered is too small, the order is made into a lot unit, whereas when the amount to be ordered is too large, it is normalized by such operations as, for example, dividing into lot units and consider each lot unit as the theoretical amount to be ordered and the amount to be ordered including loss/scrap. The above requirements ledger 26 is provided with a portion to which both amounts thus determined to be ordered are input. The requirements ledger 26 having finished requirements planning for the individual low level codes is transferred to the element explosion processing unit 14 each time the planning has been finished.

The element explosion processing unit 14 refers to bills of materials 22 in which all the composing elements to be exploded are previously stored and explodes those items to be processed into elements based on the bills of materials 22. In this case, it suffices that the aforesaid bills of materials 22 stores only the bills of materials for items to be exploded in the present order processing control module, and it does not need to store the bills of materials for all the items to be exploded in an external upper or lower level order processing control module. The processing executed by the element explosion processing unit 14 is such that an item output from the explosion item ledger 20 is collated with the bills of materials 22 and the item is exploded by reading in the exploded composing elements, and the result of the explosion is output to the above explosion item ledger 20. Then, the low level code is incremented in steps of one up to the maximum low level code and the procedure for moving into requirements planning is repeated.

Such series of operations are repeated until further element explosion by the means for exploding orders into component requirements 10 becomes impossible.

After completing the above series of operations, the dispatching processing unit 12 outputs the items entering the ordering period from among the items listed in the above requirements ledger 26 to a release order ledger 30 as a release order. The release order ledger 30 serves as an output terminal for the means for exploding orders into component requirements 10.

By the way, the aforesaid virtual warehouse 28 controls all the materials input to the order processing control module and all the materials to be input thereto, and thus controls all the exploded items stored in the bill of materials 22. The virtual warehouse 28 stores the order number, ordered amount/received amount, scheduled receiving date/actual received date, and planned stock amount/actual stock amount of released items and allocated items.

B. Explosion of Orders into Operation/Resource Requirements

Figure 3:
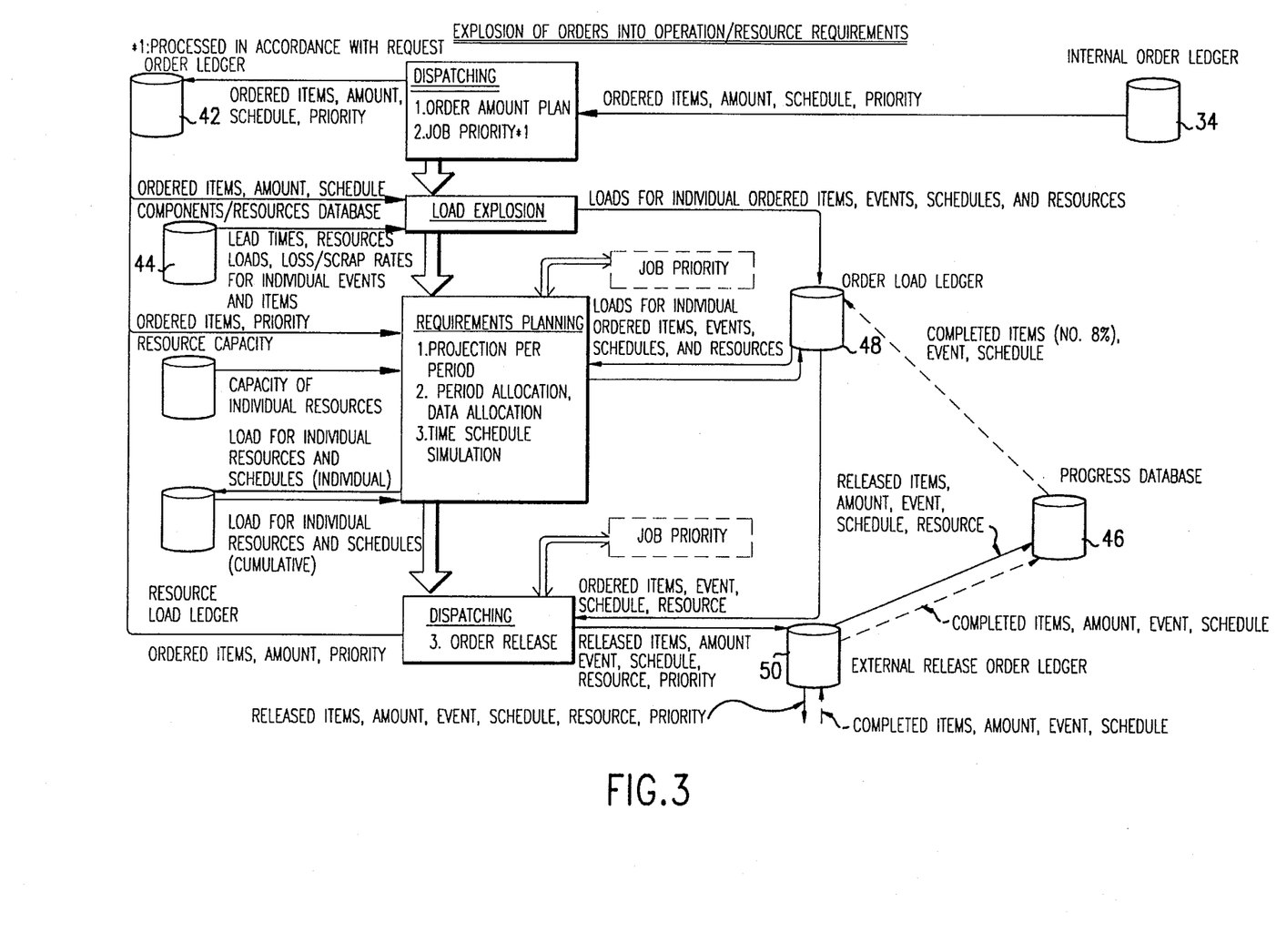
FIG. 3 is a diagram explaining the internal structure of a means for exploding orders into operation/resource requirements of the above module.

The order processing control module includes a means for exploding orders into operation/resource requirements 32 for determining the resource requirements by receiving a release order from the means for exploding orders into component requirements 10 and the means for exploding order into operation/resource requirements 32 is provided with an internal order ledger 34 for reading the release order from the release order ledger 30. The means for exploding orders into operation/resource requirements 32 includes the dispatching processing unit 36, the load explosion processing unit 38 and the requirements planning processing unit 40 internally, and the processings executed therein are exploding an order into resources/processes and determining the amount of operations for individual processes and the schedule. The explosion procedure is such that an order is read from the internal order ledger 34 and then dispatched. Then, the dispatched order is exploded into loads, and the loads for individual resources are summed up. When all the explosions are completed and a satisfactory result is obtained, a release order is determined and transferred to the release order ledger.

The means for exploding orders into operation/resource requirements 32 is provided with the above internal order ledger 34 serving as an input unit for orders generated through element explosion and released by the means for exploding orders into component requirements 10 in the order processing control module according to the embodiment for the above purpose, and there is also provided an order ledger 42 as an intermediate file to which the input order is input so that the input order is sent to the dispatching processing unit 36. The internal order book 34 keeps the release order from the means for exploding orders into component requirements 10 in its original form and transfers the same to the order ledger 42.

The dispatching processing unit 36 determines the schedule, amount, and the priority of operations for individual orders input from the order ledger 42. The amount to be ordered is calculated based on the theoretical amount to be ordered and the amount to be ordered including loss/scrap for an upper level order. Furthermore, stock processing for the progress database 46 to be described later is executed when necessary and the disposition of stock between processes is indicated. Furthermore, the order entry sequence is planned based on the priority at the time when the dispatching processing unit 36 executes a release to be described later and when the requirements planning processing unit 40 executes a processing to be described later in response to a request therefrom, wherein two kinds of priority, i.e., external priority and process priority are used. An external priority is priority from outside the system such as the degree of importance of a customer, and process priority is calculated for individual processes from the following formula based on the amount of time after a process.

process priority=remaining time/remaining operation time

Here, any delay in the schedule already passing a time limit is handled as negative remaining time in this calculation. Both external priority and process priority must be output to a lower level order processing control module, and thus the lower level order processing control module includes the process priority of an upper level order and the process priority of its own individual processes.

Furthermore, the dispatching processing unit 36 executes the processing of receiving a completed explosion of orders into operation/resource requirements and releasing the same to a lower level. This is processing for releasing orders within a limited range in the order load ledger 48 to be described later and transferring the same to an external release ledger 50. At this time, when competitive operations occur, the aforesaid operation priority is determined by the dispatching processing unit 36.

The load explosion processing unit 38 explodes for individual resources orders which are dispatched by the dispatching processing unit 36 and have their amount already been determined based on the components/resources database 44 having their lead times and loads prestored therein, and outputs the result of explosion to the order load ledger 48. This explosion processing explodes orders into lead times and converts the lead times into a schedule as well as calculates the resource load for the individual processes referring to loss/scrap rate stored in the components/resources database 44.

Figure 4A:
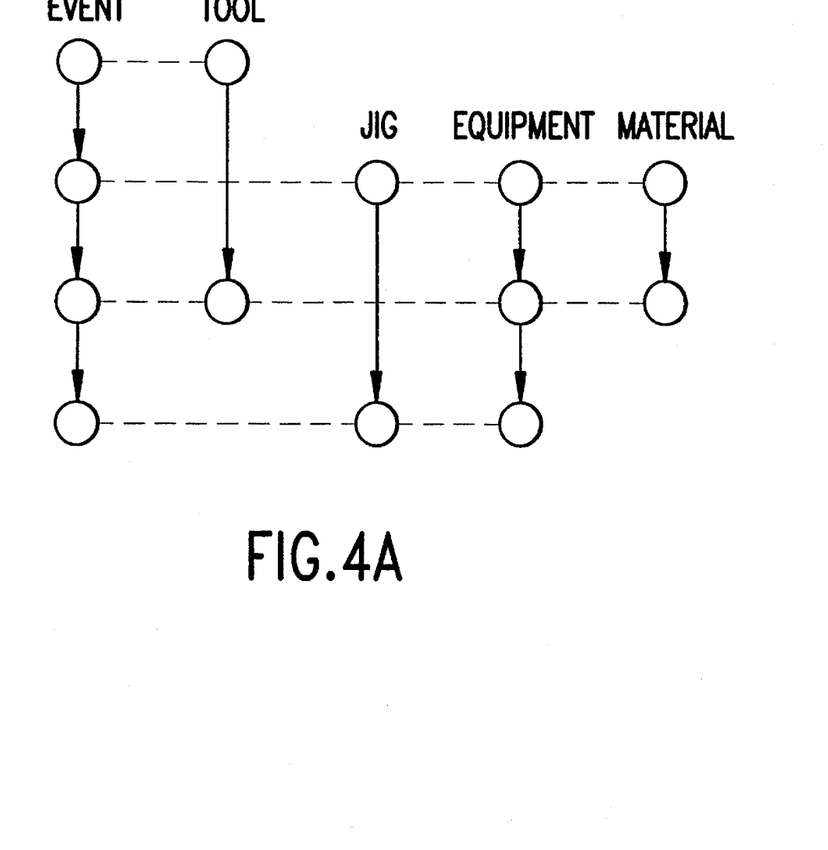
FIGS. 4A and 4B are diagrams explaining the structure of a components/resource database.

As shown in FIG. 4A, the components/resources database is structured on the basis of events and stores a plurality of resources, i.e., manpower, equipments, jigs, tools, and input materials/components in correspondence with these events. In this case, when manpower, equipments, jigs, tools, and input materials/components are related with each other, such relations are indicated. Furthermore, it is also possible to set alternative resources including alternative processes or alternative operations/sub-contracts, and to change automatically to an alternative resource or to specify alternatives for the entire orders or individual orders when a problem arises in a resource after the calculation of the requirements.

Figure 4B:
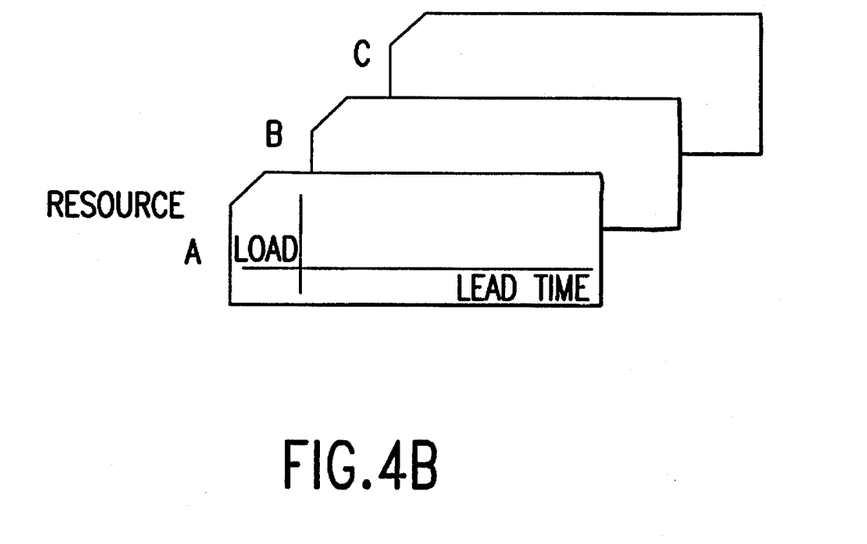

Furthermore, when there are a plurality of processes for the same order, it suffices that a parameter is added to an upper level order and individual process charts are stored in the components/resources database 44, or a parameter is added to the process charts and only the corresponding processes are exploded. When the simplification of load explosion is necessary for master production schedule planning and the like, it is possible to provide a components/resources database composed of lead time/load for the individual resources, as shown in FIG. 4B.

Next, the requirements planning processing unit 40 executes processing for projecting loads for individual resources from the result of load explosion. At this time, the requirements planning processing unit 40 projects the loads by considering the capacity of the individual resources stored in the resource capacity ledger and the allocated capacity of individual resources stored in the resource load ledger. When the accumulated loads exceed the capacity of the resource, i.e., when there are competing operations, the dispatching processing unit 36 determines the priority of the operation. This projection processing uses such methods as the projection per period, period allocation, date allocation, time schedule simulation and the like. Projection per period projects the loads of individual orders for individual resources based on the schedule wherein the entire time schedule of each order is equally assigned to the loads or period allocation is executed by using the latest starting date of each order as the starting point. Period allocation makes individual operations occupy their corresponding resources for their required operation periods from or until a scheduled date. Date allocation makes individual operations occupy their corresponding resources for their required operation days in accordance with the priority of individual operations. And furthermore, time schedule simulation dynamically assigns the available resources to a workable order released in accordance with the operation priority.

As described above, the dispatching processing unit 36 determines the schedule, lot, and operation priority, the load explosion processing unit 38 executes resources/lead time explosion and resources/loads explosion for individual orders and the requirements planning processing unit 40 projects the loads for individual resources, and the result of these processings is output to the order load ledger 48 and further to an external release order ledger 50. An order registered to the external release order ledger 50 becomes an order to the outside i.e., a sub-order, and it becomes an output unit to a sub-contractor. Furthermore, it also functions as a report input unit for the result of a plan or the execution of the plan from the sub-order which is registered to a progress database 46 to be described later.

The means for exploding orders into operation/resource requirements 32 is provided with the progress database 46 which controls all the orders input to the internal order ledger 34. The progress database 46 controls all the materials/parts and resources to be processed by orders, and data is written to the progress database 46 through the external release order ledger 50.

As described above, the order processing control module executes the explosion of orders into component and operation/resource requirements by receiving an order from an orderer through the means for exploding orders into component requirements 10 and means for exploding orders into operation/resource requirements 32, reports the result of the plan or the execution of the plan to an upper level as well as sends a sub-order to a sub-contractor and receives the report of the result of a plan or the execution of the plan therefrom. For this purpose, the progress database 46 is made so as to be able to receive an expediting report from the progress database or virtual warehouse when necessary of a lower level order processing control module, and this report is received through a path established by using the external release order ledger 50 as an input unit. An upper level report to the orderer is output to the virtual warehouse 28 through the internal order ledger 34 and the release order ledger 30 at the side of the means for exploding orders into component requirements 10 and further output from the virtual warehouse 28 to the orderer through the upper level order ledger 18. Note that both the means for exploding orders into component requirements 10 and the means for exploding orders into operation/resource requirements 32 may be provided with an actual order result ledger for the reservation of the records of finished orders on items subjected to element explosion and loads subjected to load explosion.

Note that the above structure and process may be realized in such a manner that the means for composing individual processing steps are made into a table/chart having the structures of individual processing steps, and a worksheet containing the operation procedures for the processes accompanying the processing step is registered, and furthermore, a work sheet which contains a table/chart having a parameter for controlling the processing sequence of the worksheet stored thereto and also a work sheet (meta-worksheet) with contains the procedure operated by the parameter is registered. That is, this may be executed by processing a worksheet program.

Although the above embodiment has been described for a case applied to production control, actual operations are executed in a variety of forms, and thus the embodiment must cope with individual forms. For this purpose, the order processing control module according to the embodiment has an option means for previously providing several branches of choice and selecting an appropriate method from the branches and a function for adding, modifying, and deleting the above-mentioned structures and processes.

The option means may be realized by providing a parameter worksheet which is referred to by the meta-worksheet of the above-mentioned worksheet program processing and designating a parameter when the order processing control module is generated, and an interface means may be realized by providing a change control processing portion in the above register processing of the worksheet program processing in the same way and adding, modifying, and deleting a particular worksheet by the worksheet as a whole, individual tables/charts, or individual operation procedures.

Furthermore, when an operation is actually executed, it is also necessary that a plurality of masters be used properly or a simulation be executed under a circumstance different from the present internal circumstances. For this purpose, the order processing control module according to the embodiment includes a table/chart structure by which a plurality of internal circumstances can be maintained.

The table/chart structure may be realized by providing a release control portion in the above register processing of the worksheet program processing in addition to the above change control portion and properly using the plurality of masters in accordance with the circumstances or task identification showing simulation by using a retrieving function for both control portions.

Figure 5:
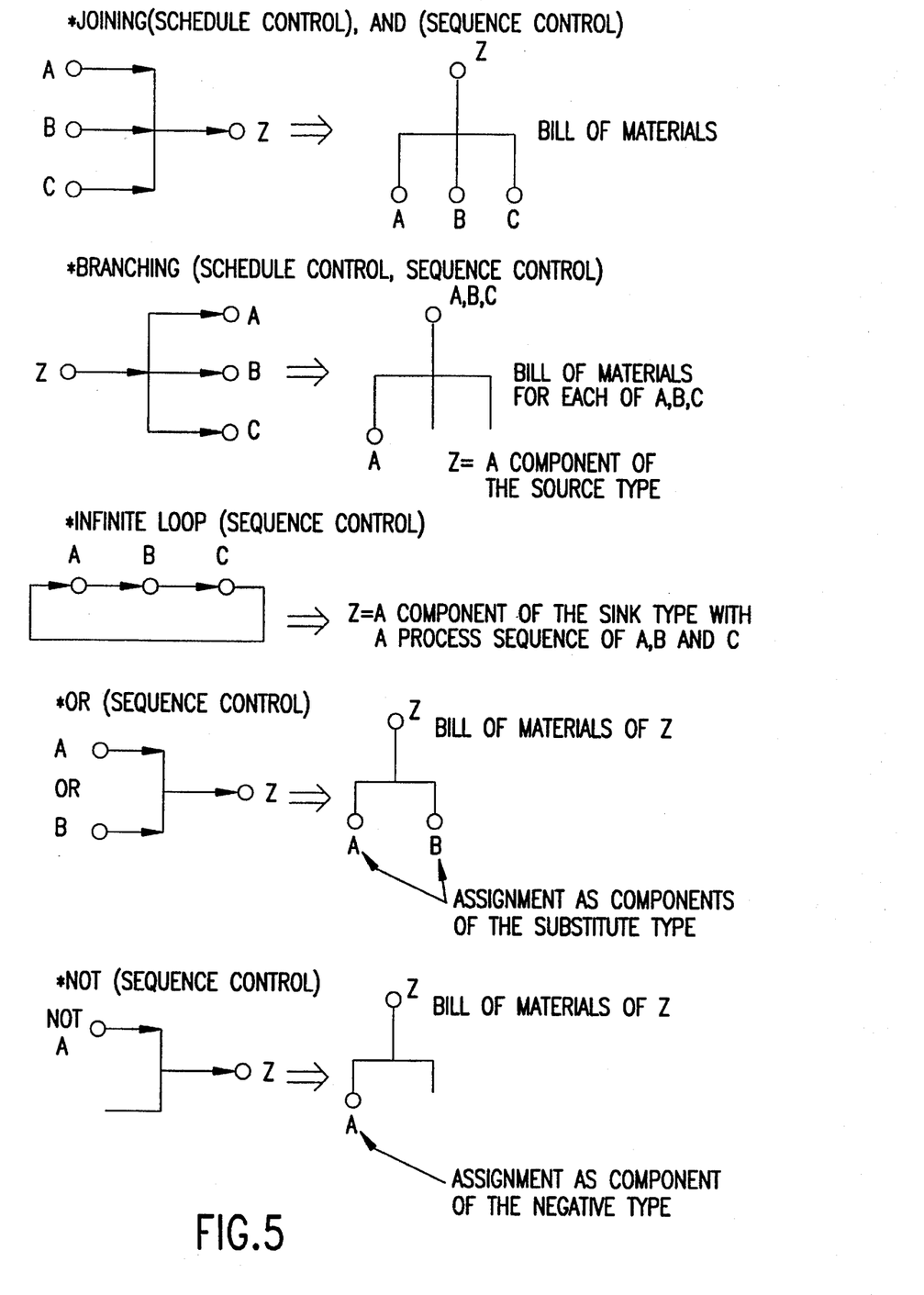
FIG. 5 is a diagram explaining the relationship between the flow for processing schedule control or sequence control and the corresponding bills of materials of the module according to the preferred embodiment.

Although the above has been described paying attention to production control, schedule control or sequence control includes flows shown in FIG. 5 which do not exist in production control.

More specifically, it is necessary to provide flows in the forms of joining in schedule control and AND in sequence control, branching in schedule control and sequence control, infinite loop in sequence control, OR in sequence control, and NOT in sequence control.

For this purpose, the order processing control module according to the embodiment provides a special type of components classifications. FIG. 5 shows these components. Joining in schedule control and AND in sequence control suffice by only replacing them with the bill of materials of an assembly which is an event succeeding the joining or the result of an AND operation. Branching in schedule control and sequence control suffice by replacing them with multiple bills of materials of individual assemblies which are the results of branching, and assigning an entity preceding the branching as a component of the source type which can supply infinitely if at least one exists and can be reset to zero. Furthermore, the infinitely loop in sequence control may be regarded as a process sequence by which a component is completed assigning the part as a component of the sink type which infinitely requests a supply if at least one exists and can be reset to zero. Furthermore, OR in sequence control suffice by replacing it with the bill of materials of an assembly which is the result of an OR operation and assigning the operands to be operated as components of the substitution type which can be substituted with each other in the bill of materials. Furthermore, NOT in sequence control suffice by replacing it with the bill of materials of an assembly which is the result of a NOT operation and assigning the operands to be operated as components of the negative type which exist only when their quantity is zero.

Figure 6A:
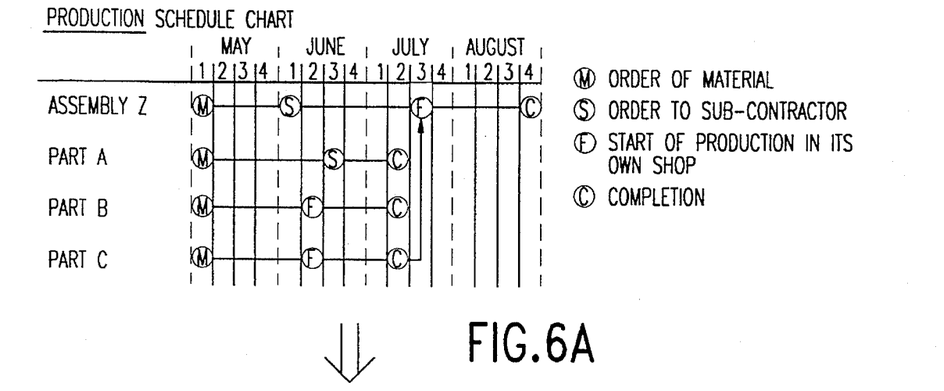
FIGS. 6A–6C are diagrams explaining a case in which schedule control is executed by making use of the order processing control module of the embodiment.
Figure 6B:
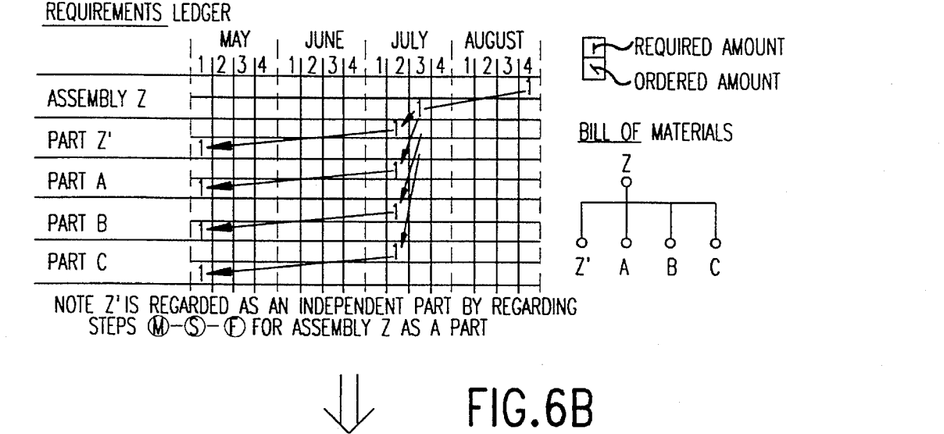
Figure 6C:
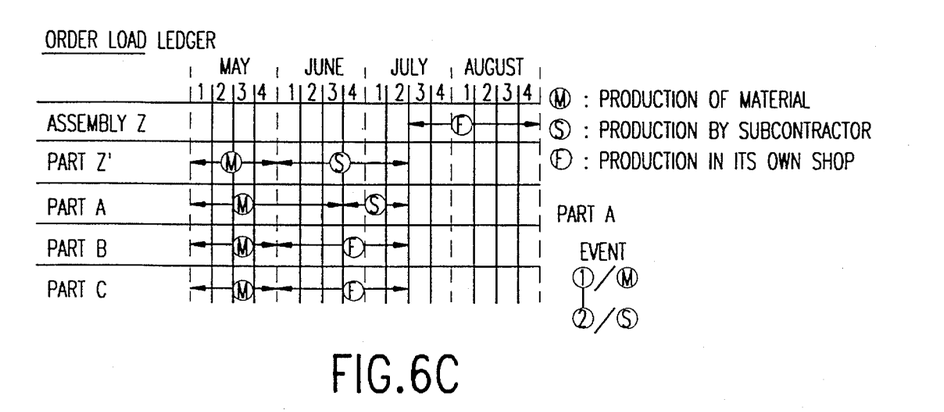

FIG. 6 shows the contents of processing when the order processing control module is applied to schedule control. FIG. 6A shows a model of a usual production schedule chart by using a Gannt chart to indicate the manufacturing schedule necessary for the completion of an assembly Z. The assembly Z is composed of components A, B and C and thus the schedules of these components are determined from the time schedule of the assembly Z. In order to output these schedule charts by the order processing control module of the embodiment, the element explosion processing unit 14 explodes the assembly Z into components by referring to the bills of materials 22 to obtain the respective components A, B and C. Furthermore, the required amounts and schedules of the individually exploded components shown in FIG. 6B are written to the requirements ledger 26 from the lead times of the assembly and respective components A, B, and C by the requirements planning processing unit 16. These are output to the means for exploding orders into operation/resource requirements 32, where the processes for individual components (production of material, production by sub-contractors or in its own shop, and the like) are read in form of event number and event names stored in the components/resources database 44, and thus, schedule charts for individual processes as shown in FIG. 6C are generated and output to the order load ledger 48. Then, this schedule chart is reported to the orderer. As described above, since the order processing control module according to the embodiment can register the components shown in FIG. 5 to the bills of materials 22 and read the same at any time, the order processing control module can also be applied to schedule control.

According to the order processing control module composed as described above, excellent results can be obtained in that the individual hierarchical levels from the enterprise level down to the controller level on production control, schedule control, sequence control or the various fields from management to services containing these elements can be easily and integrally constructed by the use of the newly provided order cell method and that the cost and period necessary for the development and maintenance of an integrated system can be greatly reduced. Furthermore, the weak points of production control, schedule control, and sequence control can be covered, and abundant methods for production control can be introduced to schedule control and sequence control. In particular, the effect of increasing flexibility while omitting programming of sequence control is worthy of special mention.

What is claimed is:

1. An order processing control module, for integrating production, schedule, and sequence control of at least one order, by making use of computer processing, and comprising:

an upper level order ledger into which an upper level order is input;

first means for exploding orders read from said upper level order ledger into component requirements and calculating a final required amount of individual components based on previously registered bills of materials and outputting the final required amount of individual components to a release order ledger;

an internal order ledger into which the final required amount of individual components is input from said release order ledger;

second means for exploding orders read from the internal order ledger into operation resource requirements, said second means comprising sequence and schedule control means for generating optimal process sequences for producing each component and calculating a resource load based on previously registered component resources data; and an external release order ledger for outputting external orders based on an output from said second means;

wherein said first means comprises a first dispatching processing unit, an element explosion processing unit, and a requirements planning processing unit, wherein said first dispatching processing unit determines at least one of a starting date and an ending date of an order, said element explosion processing unit explodes the order into components by using a previously registered bill of materials and outputs an initial required amount of each component to said requirements planning processing unit which allocates stocked and previously ordered components, and if the stocked and previously ordered amount of a component is insufficient to supply the initial required amount of a component, an amount equal to the difference between the initial required amount of the component and the stocked and previously ordered amount of the component is fed back to said first dispatching processing unit for output to the release order ledger as a final required amount of the individual component, unless the component is further exploded.

2. An order processing control module for integrating production, schedule, and sequence control of at least one order, by making use of computer processing, and comprising:

an upper level order ledger into which an upper level order is input;

first means for exploding orders read from said upper level order ledger into component requirements and calculating a final required amount of individual components based on previously registered bills of materials and outputting the final required amount of individual components to a release order ledger;

an internal order ledger into which the final required amount of individual components is input from said release order ledger;

second means for exploding orders read from the internal order ledger into operation resource requirements, said second means comprising means for generating optimal process sequences and calculating a resource load based on previously registered component resources data; and an external release order ledger for outputting external orders based on an output from said second means;

wherein said second means for exploding orders comprises a second dispatching processing unit, a load explosion processing unit, and a requirements planning processing unit, wherein said second dispatching processing unit receives an order from the internal order ledger and determines at least one of a starting date and an ending date of the order, said load explosion processing unit generates an optimal processing sequence for production of each component by using a plurality of process charts, generates a load for individual resources and inputs processing sequence and load information to said requirements planning processing unit for generating a plan for loading individual resources and reporting at least one of the plan and an execution of the plan to said first means, wherein the second dispatching processing unit performs at least one of two functions in case of a loading conflict, the first function being to assign priorities to operations and the second function being to direct the load explosion processing unit to generate alternate process sequences.

3. An order processing control module according to claim 2, wherein at least one of an upper level order ledger, a progress database, a virtual warehouse, an internal order ledger, a release order ledger, and an external release order ledger receive and send at least one of a plan and an execution of a plan generated by the requirements planning unit.

4. An order processing control module for integrating production, schedule, and sequence control of at least one order, by making use of computer processing, and comprising:

an upper level order ledger into which an upper level order is input;

first means for exploding orders read from said upper level order ledger into component requirements and calculating a final required amount of individual components based on previously registered bills of materials and outputting the final required amount of individual components to a release order ledger;

an internal order ledger into which the final required amount of individual components is input from said release order ledger;

second means for exploding orders read from the internal order ledger into operation resource requirements, said second means comprising sequence and schedule control means for generating optimal process sequences for producing each component and calculating a resource load based on previously registered component resources data; and an external release order ledger for outputting external orders based on an output from said second means;

wherein said first means and said second means further comprise an option means, respectively, by which functions performed by said first and second means are made one of partially and entirely active and partially and entirely inactive.

5. An order processing control module for integrating production, schedule, and sequence control of at least one order, by making use of computer processing, and comprising:

an upper level order ledger into which an upper level order is input;

first means for exploding orders read from said upper level order ledger into component requirements and calculating a final required amount of individual components based on previously registered bills of materials and outputting the final required amount of individual components to a release order ledger;

an internal order ledger into which the final required amount of individual components is input from said release order ledger;

second means for exploding orders read from the internal order ledger into operation resource requirements, said second means comprising sequence and schedule control means for generating optimal process sequences for producing each component and calculating a resource load based on previously registered component resources data; and an external release order ledger for outputting external orders based on an output from said second means;

wherein at least one of said first means and said second means further comprise an interface mechanism, respectively, by which a component processing method can be one of added, modified, and deleted.

6. An order processing control module for integrating production, schedule, and sequence control of at least one order, by making use of computer processing, and comprising:

an upper level order ledger into which an upper level order is input;

first means for exploding orders read from said upper level order ledger into component requirements and calculating a final required amount of individual components based on previously registered bills of materials and outputting the final required amount of individual components to a release order ledger;

an internal order ledger into which the final required amount of individual components is input from said release order ledger;

second means for exploding orders read from the internal order ledger into operation resource requirements, said second means comprising sequence and schedule control means for generating optimal process sequences for producing each component and calculating a resource load based on previously registered component resources data; and an external release order ledger for outputting external orders based on an output from said second means;

wherein at least one of said first means and said second means further comprises at least one of a table and a chart mechanism, the table and chart mechanisms maintaining a plurality of processing options for each component and maintaining internal order processing control states.

7. An order processing control module for integrating production, schedule, and sequence control of at least one order, by making use of computer processing, and comprising:

an upper level order ledger into which an upper level order is input;

first means for exploding orders read from said upper level order ledger into component requirements and calculating a final required amount of individual components based on previously registered bills of materials and outputting the final required amount of individual components to a release order ledger;

an internal order ledger into which the final required amount of individual components is input from said release order ledger;

second means for exploding orders read from the internal order ledger into operation resource requirements, said second means comprising means for generating optimal process sequences for producing each component and calculating a resource load based on previously registered component resources data; and an external release order ledger for outputting external orders based on an output from said second means;

wherein at least one of said first means for exploding and said second means for exploding further comprise sequence and schedule control means for identifying a component as one of source type which can be supplied infinitely if at least one exists and can be reset to zero, a sink type which infinitely requests a supply if at least one exists and can be reset to zero, a substitution type which can be substituted for another component, and a negative type which exists when an amount of the component is zero.

8. An order processing control module for integrating production, schedule, and sequence control of at least one order making use of computer processing, and comprising:

an upper level order ledger to which an upper level order is input;

first means for exploding orders into component requirements comprising a first dispatching processing unit, an element explosion processing unit, and a requirements planning processing unit, wherein said first dispatching processing unit determines at least one of a starting date and an ending date of an order read from said upper level order ledger, said element explosion processing unit explodes the order into individual components based on previously registered bills of materials and outputs an initial required amount of each component to said requirements planning processing unit which allocates stocked and previously ordered components, and if a stocked and previously ordered amount of a component is insufficient to supply the initial required amount of the component, an amount equal to the difference between the initial required amount of the component and the stocked or previously ordered amount of the component is fed back to said first dispatching processing unit for output to the release order ledger as a final required amount of the individual component, unless the component is further exploded;

an internal order ledger into which the final required amount of individual components is input from said release order ledger;

second means for exploding orders into operation resource requirements comprising a second dispatching processing unit, a load explosion processing unit, and a requirements planning processing unit, wherein said second dispatching processing unit receives an order from said internal order ledger and determines at least one of a starting date and an ending date of the order, said load explosion processing unit generates an optimal processing sequence for producing each component by using a plurality of process charts, generates a load for individual resources and outputs the optimal process sequence for each component and load for individual resources to said requirements planning processing unit for generating a plan for loading individual resources based on previously registered component resources data, and reporting at least one of the plan and an execution of the plan to said first means; and an external release order ledger which outputs an external order based on an output from said second means.

9. A hierarchy of at least two order processing control modules, each of the at least two order processing control modules integrating production, schedule, and sequence control of at least one order by making use of computer processing and comprising:

an upper level order ledger into which an upper level order is input;

first means for exploding orders read from said upper level order ledger into component requirements and calculating a final required amount of individual components based on previously registered bills of materials and outputting the final required amount of individual components to a release order ledger;

an internal order ledger into which the final required amount of individual components is input from said release order ledger;

second means for exploding orders read from the internal order ledger into operation resource requirements, said second means comprising sequence and schedule control means for generating optimal process sequences for producing each component and calculating a resource load based on previously registered component resources data; and an external release order ledger for outputting external orders based on an output from said second means;

wherein the at least two order processing control modules are integrated such that order processing control modules of a lower hierarchical level break down orders and processes, received from order processing control modules of a higher hierarchical level, into more detailed orders and processes.

10. An order processing control module for integrating production, schedule, and sequence control of at least one order, by making use of computer processing, and comprising:

an upper level order ledger into which an upper level order is input;

first means for exploding orders read from said upper level order ledger into component requirements and calculating a final required amount of individual components based on previously registered bills of materials and outputting the final required amount of individual components to a release order ledger;

an internal order ledger into which the final required amount of individual components is input from said release order ledger;

second means for exploding orders read from the internal order ledger into operation resource requirements, said second means comprising sequence and schedule control means for generating optimal process sequences for producing each component and calculating a resource load based on previously registered component resources data; and an external release order ledger for outputting external orders based on an output from said second means.

* * * * *